United States Patent
Hopkins

(10) Patent No.: US 7,203,688 B2
(45) Date of Patent: Apr. 10, 2007

(54) ANALYSING TACTICAL DATA LINK MESSAGES

(75) Inventor: Derek Ian Joseph Hopkins, Aldershot (GB)

(73) Assignee: Stasys Limited, Farnham, Sürrey (GB)

( * ) Notice: Subject to any disclaimer, the term of this patent is extended or adjusted under 35 U.S.C. 154(b) by 0 days.

(21) Appl. No.: 09/237,466

(22) Filed: Jan. 26, 1999

(65) Prior Publication Data

US 2002/0087572 A1  Jul. 4, 2002

(30) Foreign Application Priority Data

Jan. 27, 1998  (GB)  ............................... 9801669.4

(51) Int. Cl.
*G06F 7/00* (2006.01)
*G06F 15/00* (2006.01)

(52) U.S. Cl. ................ 707/101; 707/100; 707/10; 715/503; 715/705

(58) Field of Classification Search ............ 707/1–10, 707/100–104.1; 709/213; 455/2; 345/352; 715/503–509, 705; 342/36, 40, 49; 701/300–301
See application file for complete search history.

(56) References Cited

U.S. PATENT DOCUMENTS

| | | | | |
|---|---|---|---|---|
| 4,110,605 A | * | 8/1978 | Miller ........................ 701/124 |
| 4,196,474 A | * | 4/1980 | Buchanan et al. ........... 701/301 |
| 4,888,726 A | * | 12/1989 | Struger et al. .............. 709/201 |
| 4,907,159 A | | 3/1990 | Mauge et al. ............... 364/436 |
| 4,990,921 A | * | 2/1991 | Chisholm .................... 342/35 |
| 5,144,315 A | * | 9/1992 | Schwab et al. ............... 342/49 |
| 5,251,324 A | * | 10/1993 | McMullan, Jr. ................ 455/2 |
| 5,270,705 A | | 12/1993 | Duffy ..................... 340/870.13 |
| 5,374,923 A | * | 12/1994 | Sakamoto .................... 340/654 |
| 5,381,477 A | * | 1/1995 | Beyers, II et al. .......... 380/231 |
| 5,504,863 A | | 4/1996 | Yoshida ................. 395/184.01 |
| 5,515,285 A | * | 5/1996 | Garrett et al. .............. 701/300 |
| 5,615,323 A | | 3/1997 | Engel et al. ................ 395/140 |
| 5,673,031 A | * | 9/1997 | Meier ........................ 370/346 |
| 5,835,059 A | * | 11/1998 | Nadel et al. .................. 342/37 |
| 5,923,846 A | * | 7/1999 | Gage et al. ................. 709/213 |
| 5,971,580 A | * | 10/1999 | Hall et al. .................. 376/216 |
| 5,974,238 A | * | 10/1999 | Chase, Jr. ................... 707/200 |

(Continued)

FOREIGN PATENT DOCUMENTS

EP    0 720 108 A1    7/1996

(Continued)

*Primary Examiner*—John E. Breene
*Assistant Examiner*—Anh Ly
(74) *Attorney, Agent, or Firm*—Lahive & Cockfield, LLP

(57) ABSTRACT

A method of analyzing data link messages is disclosed. These messages include a message type field and at least one message content field whose meaning is determined by the message type. The method includes storing the plurality of data link messages in a database. The method also includes assigning each data link message to one or more message groups according to the message type field so that each group contains data link messages of a specific message type. In addition, the method includes tabulating the messages so as to align corresponding message content fields, displaying the tabulated messages so that the corresponding message content fields are aligned; and displaying a list of the field contents for each message content field. The displayed list is filtered to remove repeated incidence of the same content, within each of the message groups.

7 Claims, 3 Drawing Sheets

U.S. PATENT DOCUMENTS

| | | | | |
|---|---|---|---|---|
| 6,084,585 A | * | 7/2000 | Kraft et al. | 345/352 |
| 6,122,649 A | * | 9/2000 | Kanerva et al. | 707/516 |
| 6,133,867 A | * | 10/2000 | Eberwine et al. | 342/36 |
| 6,151,354 A | * | 11/2000 | Abbey | 375/211 |
| 6,161,097 A | * | 12/2000 | Glass et al. | 342/36 |
| 6,453,327 B1 | * | 9/2002 | Nielsen | 715/500 |
| 6,501,950 B1 | * | 12/2002 | Smith et al. | 455/423 |
| 6,661,372 B1 | * | 12/2003 | Girerd et al. | 701/215 |

FOREIGN PATENT DOCUMENTS

| | | |
|---|---|---|
| GB | 2 295 299 A | 5/1996 |
| GB | 2 306 863 A | 5/1997 |

* cited by examiner

| J 2.2 | | Air PPLI | | | | | | | |
|---|---|---|---|---|---|---|---|---|---|
| Time | Lat | Long | Course | Speed | Height | Relay S | Airborn | Call S | P |
|  |  |  |  |  |  |  |  |  |  |
|  |  |  |  |  |  |  |  |  |  |
|  |  |  |  |  | - |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |

Air PPLI

| Time | Latitude | Longitude | Course | Speed | Height | Relay Status | Airborne Status | Voice Call Sign | Platform Type |
|---|---|---|---|---|---|---|---|---|---|
| 13:28:25 | 51.259 | -0.707 | 25 | 515 | 12015 | Inactive | Airborne | TX01 | F-16 |
| 13:28:37 | 51.27456 | -0.69547 | 25 | 519 | 12020 | Inactive | Airborne | TX01 | F-16 |
| 13:28:49 | 51.29024 | -0.68385 | 25 | 502 | 12057 | Inactive | Airborne | TX01 | F-16 |
| 13:29:01 | 51.30595 | -0.67221 | 25 | 522 | 12103 | Inactive | Airborne | TX01 | F-16 |
| 13:29:13 | 51.32172 | -0.6053 | 26 | 522 | 12116 | Inactive | Airborne | TX01 | F-16 |
| 13:29:25 | 51.33736 | -0.64841 | 30 | 524 | 12161 | Inactive | Airborne | TX01 | F-16 |
| 13:29:37 | 51.35248 | -0.63453 | 31 | 526 | 12210 | Inactive | Airborne | TX01 | F-16 |
| 13:29:49 | 51.36751 | -0.62018 | 31 | 529 | 12223 | Inactive | Airborne | TX01 | F-16 |

Fig 3

ANALYSING TACTICAL DATA LINK MESSAGES

TECHNICAL FIELD OF THE INVENTION

The present invention relates to a method of analysing data link messages. It is particularly useful for detecting interoperability conflicts between the various sources of such messages. In this application, the description is directed to the interpretation of tactical data link messages, but the principle of the invention can be applied to like messages.

BACKGROUND OF THE INVENTION

Tactical data links operate by exchanging messages between military units such as aircraft, ships, ground stations etc, which are synchronised in a radio network. Messages are transmitted in a digital form and consist of a stream of data bits formatted according to certain rules. These rules lay down that messages have a fixed format dependent on their message type. Different message types are intended to contain different information. For example, a track message will contain position and velocity information of (for example) an aircraft, whilst a status message will contain fuel data and weapons status of the aircraft. At present, approximately fifty different types of messages are defined for each link.

The message types and formats for each type are set down according to NATO rules and in theory a platform conforming to those rules should therefore be able to communicate with any other platform which also follows those rules. In other words, the platforms are fully interoperable and can communicate with each other satisfactorily. In practice, the rules are inevitably insufficiently comprehensive to cover every eventuality. There is therefore scope for variation between different platform implementations, and these variations typically lead to interoperability problems. For example, a receiving platform may require that an incoming message contains certain information whereas the transmitting platform for some reason does not include that information. This would result in the receiving platform discarding that message as it did not meet its processing rules.

Interoperability problems such as this can be discovered by comparing the different platform implementations with reference to their build specifications. However, the specifications themselves may be unclear and the procedure would in any case be lengthy and difficult. It is more usual for interoperability problems to be discovered during a trial when the messages are recorded and their contents matched against expected events in each platform.

The difficulty with this latter approach is that data is generated by tactical data links at a very high rate. It is normal to generate approximately 20 MB of data during a two hour flight by a single platform. This can be compressed for transmission, but for analysis will obviously need to be decompressed. A lengthy trial with a significant number of platforms will clearly generate a prima facie unmanageable volume of data.

It is however essential that interoperability problems are identified in order to allow their resolution. Such difficulties could significantly impair the effectiveness of armed forces in a conflict situation, the implications of which are clear.

At present, data is sorted chronologically and placed into a database. The sheer volume of data and the wide range of information that may be included within a specific message field due to the large number of message formats means that direct inspection of the data is not physically possible on any significant scale. However, databases allow a user to present queries, which are essentially filters to select those entries which meet certain criteria. Thus, a user can present the database with queries intended to illuminate interoperability conflicts.

The use of databases to analyse the data in this way has certain defects. It is immediately apparent to a user that the databases take a significant amount of time to analyse the data and respond to the query. Whilst this could in future be solved by applying ever greater processing power to the database, it would be useful to be able to accelerate the process. At present, the various stages necessary to convert the data into a form readable by the database, enter it into the database, select appropriate queries and obtain responses and analyse those responses means that, at best, results are available several days after the trial. It would be useful if those results were available at the post-trial debrief. As this is held a matter of hours after the trial end, whilst operators memories are still fresh, this is simply not practical at present.

Existing databases also suffer from a more fundamental flaw. It is up to the user to generate queries, and therefore this requires an a priori knowledge of the type of interoperability conflicts likely to arise. The user is not generally in a position to detect unexpected interoperability errors, as the raw data cannot feasibly be inspected and the processing time required rules out the use of a large number of speculative queries aimed at detecting unlikely or unsuspected conflicts. Speculative queries also require the user to have an intimate knowledge of the type of content in particular message fields, in order to detect unusual entries. This again cannot be guaranteed, and is clearly unlikely in the case of unsuspected conflicts.

SUMMARY OF THE INVENTION

The present invention seeks to provide a more intuitive analysis method for data link messages which is capable of providing speedier analysis.

The present invention therefore provides a method of analysing data link messages, comprising the steps of:
 a) receiving a plurality of data link messages;
 b) assigning each data link message to one of a plurality of message groups such that each group contains data link messages of a specific message type;
 c) within a group,
  (i) tabulating the messages so as to align corresponding fields;
  (ii) displaying the tabulated data,
 (d) displaying a list of field contents for each field type, the list being filtered to remove repeated incidence of the same content.

Thus, the list simultaneously presents the user with a summary of the common entries for a particular field type and any spurious or unusual entries. For example, if an entry normally contained a number between 1 and 12, for example, this list would comprise a random scattering of numbers in this range. If it also included a value such as 87 or a text value then at least one platform within the trial is clearly transmitting an incompatible message. It is likely that that message has a different meaning or is for some reason erroneous. This type of analysis does not require the operator to be aware a priori of the likely message content.

The processing is preferably applied to all groups, but may be applied to a single group if it is known that this is the source of problems.

It will clearly be preferable for a group to contain all data link messages of a specific message type.

It is further preferred to allow the group to be filtered so as to display only messages having a particular content for that field type, the content having been selected from the list. This enables an immediate selection to be made of erroneous or unusual entries in the list, which will then highlight the message or messages containing that entry. This would then enable the user to identify the platform or platforms generating those messages and institute appropriate corrective action.

A small modification to the above which may on occasions be useful is for the lists to remove repeated incidence of content falling with a specified narrow range. This could be more useful for continuously variable data types. It could for example be applied to latitude or longitude data to identify messages being received from platforms in an incorrect theatre.

As mentioned above, it is particularly envisaged that the invention will be applied to tactical data link messages. However, the principle can be applied to other data links and the invention is not therefore limited in this respect.

BRIEF DESCRIPTION OF THE DRAWINGS

Embodiments of the present invention will now be described by way of example, with reference to the accompanying Figures, in which:

FIG. 3 shows an arrangement similar to FIG. 2 employing a commercially available programme.

DESCRIPTION OF THE PREFERRED EMBODIMENTS

Figures 1, 2:
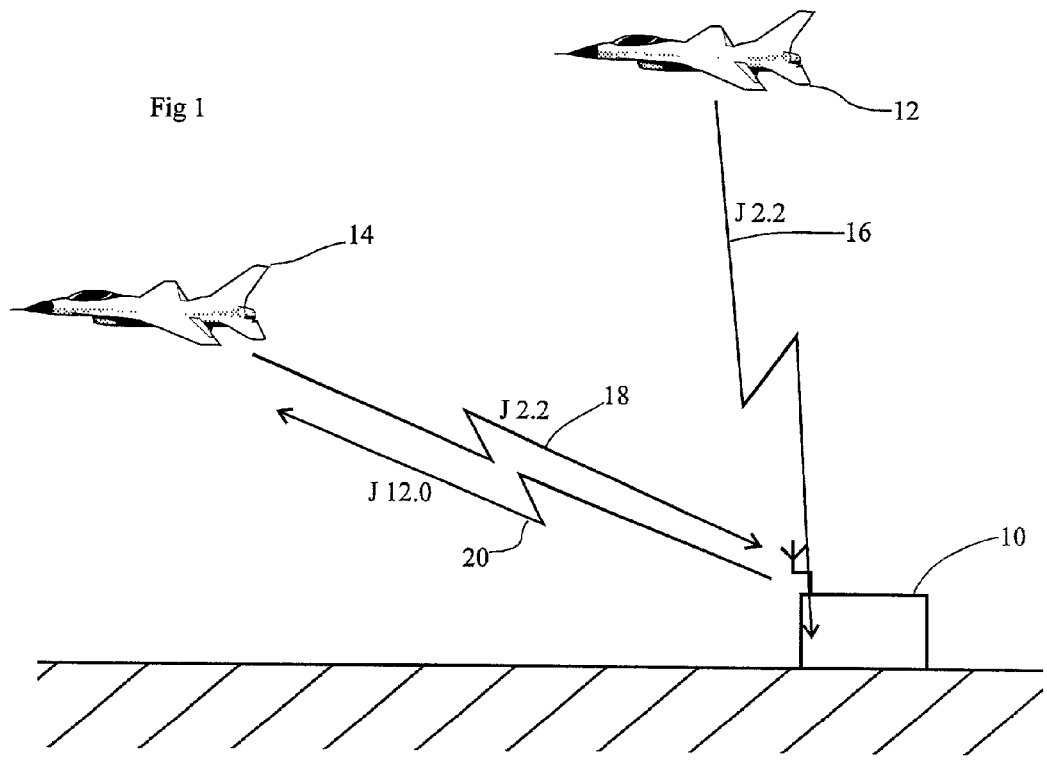
FIG. 1 shows the exchange of tactical data link messages.
FIG. 2 shows the tactical data link messages arranged and displayed according to the present invention.

Tactical data links operate by exchanging messages between units (aircrafts, ships, ground stations) which are synchronised in a radio network. Several different links are implemented, and are known as Link x where x is a number, Link 11, Link 16 etc. The different links use different radio signals and different radio sets to transmit and receive information. The messages are transmitted in digital form, consisting of a stream of data bits formatted according to rules set out in the Link standard. For Links such as Link 16, the messages are transmitted at a high rate and contain information accurate to within a few seconds.

The messages are formatted as different types, each type having a fixed format and containing similar information. The different message types have completely different formats and contain different information. For example, the types may consist of a track message, which contains position and velocity of a track, and a status message which contains fuel and weapons status of an aircraft. Within the framework of Link 16, some 50 different types of message are defined.

Within the structure of Link 16, each platform is assigned time slots of 7.8 ms duration and transmits messages only in those slots (but not necessarily in all of them). Messages may be transmitted regularly at defined intervals, or as "one offs" resulting from some operator action. Messages can be one of about 50 different types, which correspond to different possibilities for information exchange. For Link 16, each message type has a unique designation as a two part number of the form x,y. Thus, there are 256 different designations possible, of which approximately 50 are used, as mentioned above. Each message may contain between about 50 and 300 bits of information. The message is split into a number of fields which contain information relevant to the use of that particular message. For example, a track message will contain fields for latitude, longitude, speed, aircraft type etc. The representation of each field is fixed for a particular message type, so that a message can be decoded if the structure is known and the message type received. Some examples of messages are given below.

| Number | Name | Use |
|---|---|---|
| J0.0 | Initial Entry | Allows units to synchronise to the network |
| J2.2 | Air PPLI | Transmitted by Link 16 equipped units to give precise positional and identification data |
| J3.2 | Air Track | Transmitted by command and control units to disseminate track data on the network |
| J12.0 | Mission Assignment | One-off message used to assign a tactical mission to a controlled unit |
| J13.0 | Airfield Status | Gives weather and other information about airfields |

By way of example, the list of fields for an Air PPLI message includes latitude, longitude, course, speed, height, relay status, airborne status, voice call sign and platform type.

All tactical data links and certain other types of data link such as buses that connect processors in some data processing systems have a similar message structure.

A recording of a tactical data link will contain all messages that have been transmitted by all units with a certain time frame. The recording contains message of different types, ordered chronologically. The analysis tool must decode messages into fields and sort them. In the past, using text-based analysis tools, the messages have been sorted chronologically.

FIG. 1 illustrates tactical data links in progress, transferring messages 16, 18, 20 to and from a ground station 10 and operating aircraft 12, 14.

FIG. 2 shows the manner in which data is ordered and structured according to the present invention. Thus, messages are first sorted by message type and grouped accordingly. Within a message group, they can be sorted chronologically if desired. The messages are then tabulated such that each field is displayed in an aligned relationship to other fields.

Figure 4:
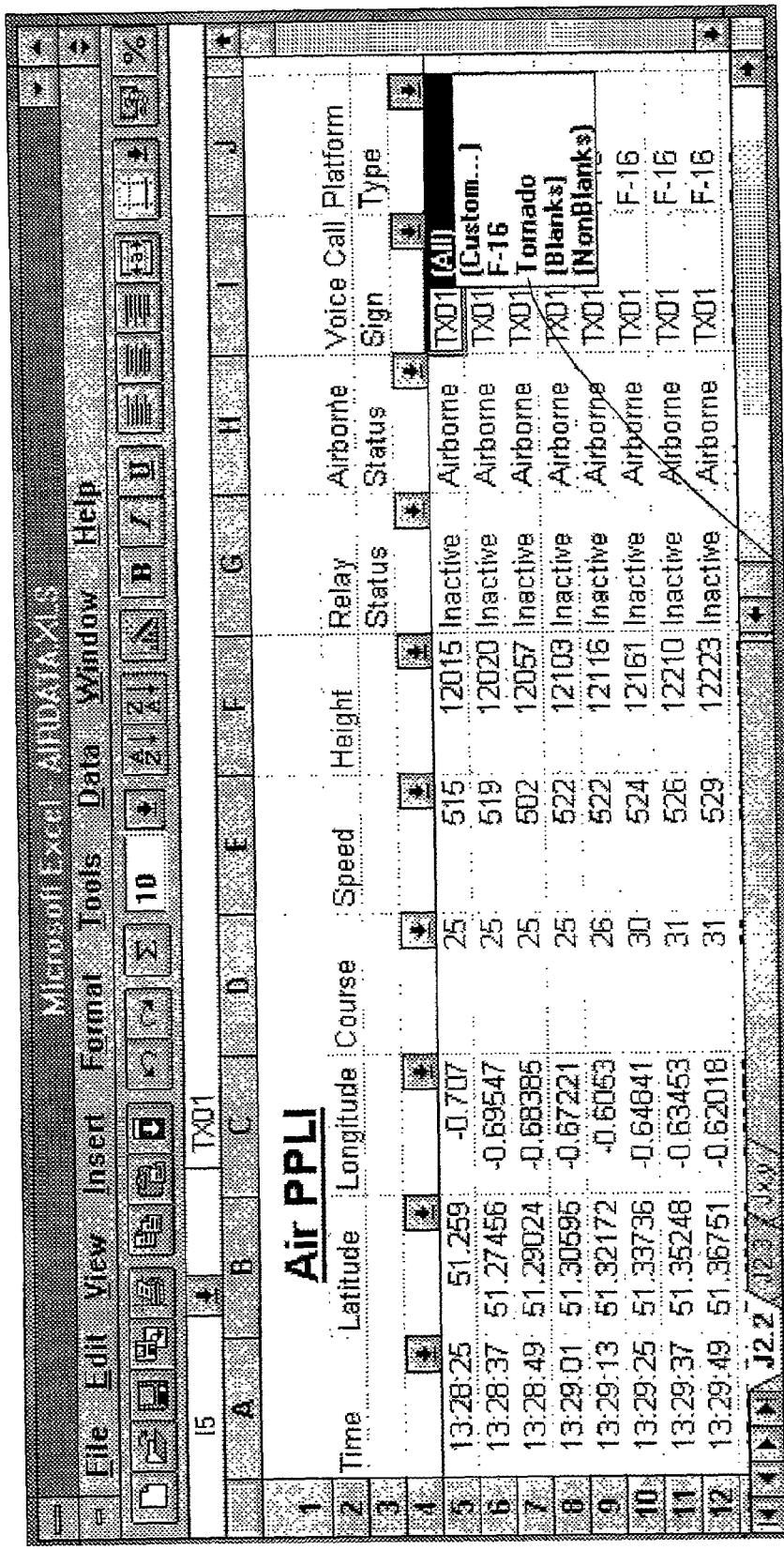
FIG. 4 shows the data of FIG. 3 being analysed.

FIG. 3 shows the same data displayed by a commercially available programme, Microsoft Excel. Microsoft is a registered Trade Mark. Markers 50 indicate that a drop down menu can be selected, as shown in FIG. 4, to reveal all the discrete values within that field. Anomalous values such as that illustrated at 52 are clearly highlighted. Selection of these values from the field results in the programme automatically applying a filter aimed at selecting that or those messages. These messages can then be inspected individually to trace the source platform.

It will be apparent that use of the analysis method set out above enables unusual or spurious entries to be detected very quickly. Messages such as the Air PPLI type include a total of forty fields, so it will therefore take only a matter of seconds to look through the individual filter results and identify spurious or unusual entries. The tabulated storage method is also very much less unwieldy than a database, and therefore can be filtered to reveal the erroneous message much more quickly. In tests, analysis results have been available in time for the post-exercise debrief, a matter of hours. This compares with the several days required to analyse the same data through the use of a database.

It will be appreciated that many variations could be made to the above described example without departing from the scope of the present invention.

What is claimed is:

1. A method of analysing data link messages, the method comprising the steps of:
   (a) receiving a plurality of data link messages, each of the data link messages being formatted digital data sequences transmitted between units, and include a message type field and at least one message content field whose meaning is determined by the message type;
   (b) storing the plurality of data link messages in a database;
   (c) assigning each data link message to one of a plurality of message groups according to the message type field so that each group contains data link messages of a specific message type;
   (d) within each of the message groups,
      (i) tabulating the messages so as to align corresponding message content fields;
      (ii) displaying the tabulated messages so that the corresponding message content fields are aligned;
      (iii) filtering selected message content fields to remove repeated incidences of the same content; and
      (iv) displaying a list of the field contents for each message content field.

2. A method according to claim 1 wherein each group contains all data link messages of a specific message type.

3. A method according to claim 1 wherein the list is sorted in a desired order.

4. A method according to claim 1 wherein the group is filtered so as to display only messages having a particular content for that field type, the content having been selected from the list.

5. A method according to claim 1 wherein the list is filtered to remove repeated incidence of content falling with a specified range.

6. A method according to claim 1 in which the data link messages are tactical data link messages.

7. A method according to claim 1 in which the messages are tactical data link messages originating from a plurality of military platforms, the messages being in digital form, at least some of which being transmitted by the units via a wireless network.

* * * * *